US011741944B2

(12) United States Patent
Sharifi et al.

(10) Patent No.: US 11,741,944 B2
(45) Date of Patent: Aug. 29, 2023

(54) SPEECH PERSONALIZATION AND FEDERATED TRAINING USING REAL WORLD NOISE

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 155 days.

(21) Appl. No.: 17/103,878

(22) Filed: Nov. 24, 2020

(65) Prior Publication Data
US 2022/0165253 A1 May 26, 2022

(51) Int. Cl.
G10L 15/00 (2013.01)
G10L 15/06 (2013.01)
(Continued)

(52) U.S. Cl.
CPC .......... G10L 15/063 (2013.01); G10L 15/187 (2013.01); G10L 15/20 (2013.01);
(Continued)

(58) Field of Classification Search
CPC ..... G10L 15/063; G10L 15/187; G10L 15/20; G10L 15/22; G10L 15/30; G10L 21/0232;
(Continued)

(56) References Cited

U.S. PATENT DOCUMENTS 9,799,329 B1 * 10/2017 Pogue ..................... G10L 15/22
9,886,954 B1 * 2/2018 Meacham ............... G10L 25/84
(Continued)

FOREIGN PATENT DOCUMENTS

CN 111081222 A 4/2020
GB 2401469 A 11/2004

OTHER PUBLICATIONS

Huang, Sung-Feng, et al., "Improved audio embeddings by adjacency-based clustering with applications in spoken term detection," (2018), arXiv preprint arXiv:1811.02775, pp. 1-5 (Year: 2018).*
(Continued)

Primary Examiner — Andrew C Flanders
Assistant Examiner — Parker Mayfield
(74) Attorney, Agent, or Firm — Honigman LLP; Brett A. Krueger; Grant J. Griffith

(57) ABSTRACT

A method of training a speech model includes receiving, at a voice-enabled device, a fixed set of training utterances where each training utterance in the fixed set of training utterances includes a transcription paired with a speech representation of the corresponding training utterance. The method also includes sampling noisy audio data from an environment of the voice-enabled device. For each training utterance in the fixed set of training utterances, the method further includes augmenting, using the noisy audio data sampled from the environment of the voice-enabled device, the speech representation of the corresponding training utterance to generate noisy audio samples and pairing each of the noisy audio samples with the corresponding transcription of the corresponding training utterance. The method additionally includes training a speech model on the noisy audio samples generated for each speech representation in the fixed set of training utterances.

30 Claims, 6 Drawing Sheets

(51) Int. Cl.
  *G10L 15/187* (2013.01)
  *G10L 15/20* (2006.01)
  *G10L 15/22* (2006.01)
  *G10L 15/30* (2013.01)
  *G10L 21/0232* (2013.01)
  *G10L 15/08* (2006.01)

(52) U.S. Cl.
  CPC .............. *G10L 15/22* (2013.01); *G10L 15/30* (2013.01); *G10L 21/0232* (2013.01); *G10L 2015/088* (2013.01)

(58) Field of Classification Search
  CPC .............. G10L 2015/088; G10L 21/02; G10L 21/0272; G10L 21/0364; G10L 25/84; G10L 15/00
  See application file for complete search history.

(56) References Cited

U.S. PATENT DOCUMENTS

| | | | |
|---|---|---|---|
| 10,147,442 B1* | 12/2018 | Panchapagesan | G06N 3/04 |
| 11,227,187 B1* | 1/2022 | Weinberger | G06T 7/11 |
| 2003/0191636 A1* | 10/2003 | Zhou | G10L 15/065 |
| | | | 704/E15.01 |
| 2014/0278420 A1* | 9/2014 | Meloney | G10L 15/063 |
| | | | 704/249 |
| 2016/0260429 A1* | 9/2016 | Jin | G10L 15/063 |
| 2017/0133006 A1* | 5/2017 | Lee | G10L 15/063 |
| 2019/0228791 A1 | 7/2019 | Sun et al. | |

OTHER PUBLICATIONS

International Search Report and Written Opinion related to Application No. PCT/US2021/059415, dated May 3, 2022.

* cited by examiner

SPEECH PERSONALIZATION AND FEDERATED TRAINING USING REAL WORLD NOISE

TECHNICAL FIELD

This disclosure relates to speech personalization and federated training using real world noise.

BACKGROUND

Automatic speech recognition (ASR) is an important technology that is used in mobile devices and other devices. In general, automatic speech recognition attempts to provide accurate transcriptions of what a person has said. Devices implementing ASR may also use hotwords or wakewords that help discern when a given utterance is directed at the system, as opposed to an utterance that is directed to another individual present in the environment.

One major challenge faced by ASR systems is that a single model needs to be able to handle speech inputs from all users in a single locale where huge variations in accent, vocabulary, and types of background noise exist across the different users. Another challenge to personalizing speech recognition models is that accurate transcriptions are required to label the audio data, rendering the training of an entire speech recognition model on a user's device from scratch infeasible.

SUMMARY

One aspect of the disclosure provides a method of training a speech model. The method includes receiving, at data processing hardware of a voice-enabled device, a fixed set of training utterances where each training utterance in the fixed set of training utterances includes a corresponding transcription paired with a corresponding speech representation of the corresponding training utterance. The method also includes sampling, by the data processing hardware, noisy audio data from an environment of the voice-enabled device. For each training utterance in the fixed set of training utterances, the method includes augmenting, by the data processing hardware, using the noisy audio data sampled from the environment of the voice-enabled device, the corresponding speech representation of the corresponding training utterance to generate one or more corresponding noisy audio samples and pairing, by the data processing hardware, each of the one or more corresponding noisy audio samples with the corresponding transcription of the corresponding training utterance. The method further includes training, by the data processing hardware, a speech model on the one or more corresponding noisy audio samples generated for each speech representation in the fixed set of training utterances.

In some examples, the method also includes, prior to augmenting the corresponding speech representation of the corresponding training utterance, de-noising, by the data processing hardware, the corresponding speech representation to remove any previously existing noise. In some implementations, the method further includes, after pairing each of the one or more corresponding noisy audio samples with the corresponding transcription of the corresponding training utterance, storing, by the data processing hardware, on memory hardware in communication with the data processing hardware, the pairing of each of the one or more corresponding noisy samples with the corresponding transcription of the corresponding training utterance.

In some configurations, when the speech model includes a speech recognition model, the method additionally includes, for each speech representation in the fixed set of training utterances and each noisy audio sample of the one or more noisy audio samples generated for the corresponding speech representation, determining, by the data processing hardware, for output by the speech model, a corresponding probability distribution over possible speech recognition hypotheses for the corresponding speech representation or the corresponding noisy audio sample and generating, by the data processing hardware, a loss term based on the corresponding probability distribution over possible speech recognition hypotheses for the corresponding speech representation or the corresponding noisy audio sample. In these configurations, training the speech model may include updating parameters of the speech recognition model using the loss term generated for each speech representation in the fixed set of training utterances and each noisy audio sample of the one or more noisy audio samples generated for each corresponding speech representation in the fixed set of training utterances. Training the speech model may additionally or alternatively include transmitting, to a central server, the loss term generated for each speech representation in the fixed set of training utterances and each noisy audio sample of the one or more noisy audio samples generated for each corresponding speech representation in the fixed set of training utterances. The central server may be configured to use federated learning to update parameters of a server-side speech recognition model based on the loss terms received from the data processing hardware of the voice-enabled device and other loss terms received from other voice-enabled devices where the other loss terms received from each other voice-enabled device based on different noisy audio data sampled by the corresponding other voice-enabled device.

In some examples, for at least one training utterance in the fixed set of training utterances, the method also includes obtaining, by the data processing hardware, a corresponding spoken utterance sampled from the environment of the voice-enabled device that is phonetically similar to the corresponding speech representation of the corresponding training utterance and is paired with a respective transcription that is different than the corresponding transcription that is paired with the corresponding speech representation of the at least one training utterance. In these examples, training the speech model on the fixed set of training utterances and the one or more corresponding noisy audio samples is further based on the corresponding spoken utterance obtained for the at least one training utterance in the fixed set of training utterances. Obtaining the corresponding spoken utterance for the at least one training utterance in the fixed set of training utterances may include sampling the corresponding spoken utterance from the environment of the voice-enabled device, determining that the corresponding spoken utterance sampled from the environment is phonetically similar to the corresponding speech representation of the at least one corresponding training utterance based on a comparison of a respective embedding generated for the corresponding spoken utterance and a respective embedding generated for the corresponding speech representation of the at least one training utterance, obtaining the respective transcription of the corresponding spoken utterance sampled from the environment of the voice-enabled device, and determining that the respective transcription of the corresponding spoken utterance is different than the corresponding transcription that is paired with the corresponding speech representation of the at least one training utterance.

An embedding model or a portion of the speech model may generate the respective embedding for each of the corresponding spoken utterance and the corresponding speech representation of the at least one training utterance. In these examples, the corresponding speech representation of the at least one training utterance represents a spoken representation of a particular fixed term. The speech model may include a hotword detection model trained to detect a particular fixed term. For a hotword detection model, training the hotword detection model to detect the particular fixed term includes using the corresponding spoken utterance obtained for the at least one training utterance as a negative training sample.

Another aspect of the disclosure provides a system for training a speech model. The system includes data processing hardware and memory hardware in communication with the data processing hardware. The memory hardware stores instructions that when executed on the data processing hardware cause the data processing hardware to perform operations. The operations include receiving, at a voice-enabled device, a fixed set of training utterances where each training utterance in the fixed set of training utterances includes a corresponding transcription paired with a corresponding speech representation of the corresponding training utterance. The operations also include sampling noisy audio data from an environment of the voice-enabled device. For each training utterance in the fixed set of training utterances, the operations include augmenting, using the noisy audio data sampled from the environment of the voice-enabled device, the corresponding speech representation of the corresponding training utterance to generate one or more corresponding noisy audio samples and pairing each of the one or more corresponding noisy audio samples with the corresponding transcription of the corresponding training utterance. The operations further include training a speech model on the one or more corresponding noisy audio samples generated for each speech representation in the fixed set of training utterances. This aspect may include one or more of the following optional features.

In some examples, the operations also include, prior to augmenting the corresponding speech representation of the corresponding training utterance, de-noising the corresponding speech representation to remove any previously existing noise. In some implementations, the operations further include, after pairing each of the one or more corresponding noisy audio samples with the corresponding transcription of the corresponding training utterance, storing on memory hardware in communication with the data processing hardware, the pairing of each of the one or more corresponding noisy samples with the corresponding transcription of the corresponding training utterance.

In some configurations, when the speech model includes a speech recognition model, the operations additionally include, for each speech representation in the fixed set of training utterances and each noisy audio sample of the one or more noisy audio samples generated for the corresponding speech representation, determining, for output by the speech model, a corresponding probability distribution over possible speech recognition hypothesis for the corresponding speech representation or the corresponding noisy audio sample and generating a loss term based on the corresponding probability distribution over possible speech recognition hypotheses for the corresponding speech representation or the corresponding noisy audio sample. In these configurations, training the speech model may include updating parameters of the speech recognition model using the loss term generated for each speech representation in the fixed set of training utterances and each noisy audio sample of the one or more noisy audio samples generated for each corresponding speech representation in the fixed set of training utterances. Training the speech model may additionally or alternatively include transmitting, to a central server, the loss term generated for each speech representation in the fixed set of training utterances and each noisy audio sample of the one or more noisy audio samples generated for each corresponding speech representation in the fixed set of training utterances. The central server may be configured to use federated learning to update parameters of a server-side speech recognition model based on the loss terms received from the data processing hardware of the voice-enabled device and other loss terms received from other voice-enabled devices where the other loss terms received from each other voice-enabled device based on different noisy audio data sampled by the corresponding other voice-enabled device.

In some examples, for at least one training utterance in the fixed set of training utterances, the operations also include obtaining a corresponding spoken utterance sampled from the environment of the voice-enabled device that is phonetically similar to the corresponding speech representation of the corresponding training utterance and is paired with a respective transcription that is different than the corresponding transcription that is paired with the corresponding speech representation of the at least one training utterance. In these examples, training the speech model on the fixed set of training utterances and the one or more corresponding noisy audio samples is further based on the corresponding spoken utterance obtained for the at least one training utterance in the fixed set of training utterances. Obtaining the corresponding spoken utterance for the at least one training utterance in the fixed set of training utterances may include sampling the corresponding spoken utterance from the environment of the voice-enabled device, determining that the corresponding spoken utterance sampled from the environment is phonetically similar to the corresponding speech representation of the at least one corresponding training utterance based on a comparison of a respective embedding generated for the corresponding spoken utterance and a respective embedding generated for the corresponding speech representation of the at least one training utterance, obtaining the respective transcription of the corresponding spoken utterance sampled from the environment of the voice-enabled device, and determining that the respective transcription of the corresponding spoken utterance is different than the corresponding transcription that is paired with the corresponding speech representation of the at least one training utterance. An embedding model or a portion of the speech model may generate the respective embedding for each of the corresponding spoken utterance and the corresponding speech representation of the at least one training utterance. In these examples, the corresponding speech representation of the at least one training utterance represents a spoken representation of a particular fixed term. The speech model may include a hotword detection model trained to detect a particular fixed term. For a hotword detection model, training the hotword detection model to detect the particular fixed term includes using the corresponding spoken utterance obtained for the at least one training utterance as a negative training sample.

Implementations of the system or the method may include one or more of the following optional features. In some implementations, sampling the noisy audio data from the environment of the voice-enabled device includes randomly sampling noise from the environment of the voice-enabled device at least one of immediately before, during, or immediately after speech interactions between the voice-enabled device and a user associated with the voice-enabled device. In other implementations, sampling the noisy audio data from the environment of the voice-enabled device includes obtaining contexts and/or time windows when a user of the voice-enabled device frequently interacts with the voice-enabled device and sampling the noisy audio data from the environment of the voice-enabled device during the obtained contexts and/or time windows when the user of the voice-enabled device frequency interacts with the voice-enabled device. In yet other implementations, sampling the noisy audio data from the environment of the voice-enabled device includes randomly sampling noisy audio data from the environment of the voice-enabled device throughout a day and applying weights to any of the noisy audio data sampled from the environment during contexts and/or time windows when a user of the voice-enabled frequently interacts with the voice-enabled device more. A digital signal processor (DSP) of the data processing hardware may sample the noisy audio data from the environment of the voice-enabled device. In some examples, the corresponding speech representation for at least one training utterance includes a raw audio waveform of the corresponding training utterance. In other examples, the corresponding speech representation for at least one training utterance includes an audio feature representation of the corresponding training utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
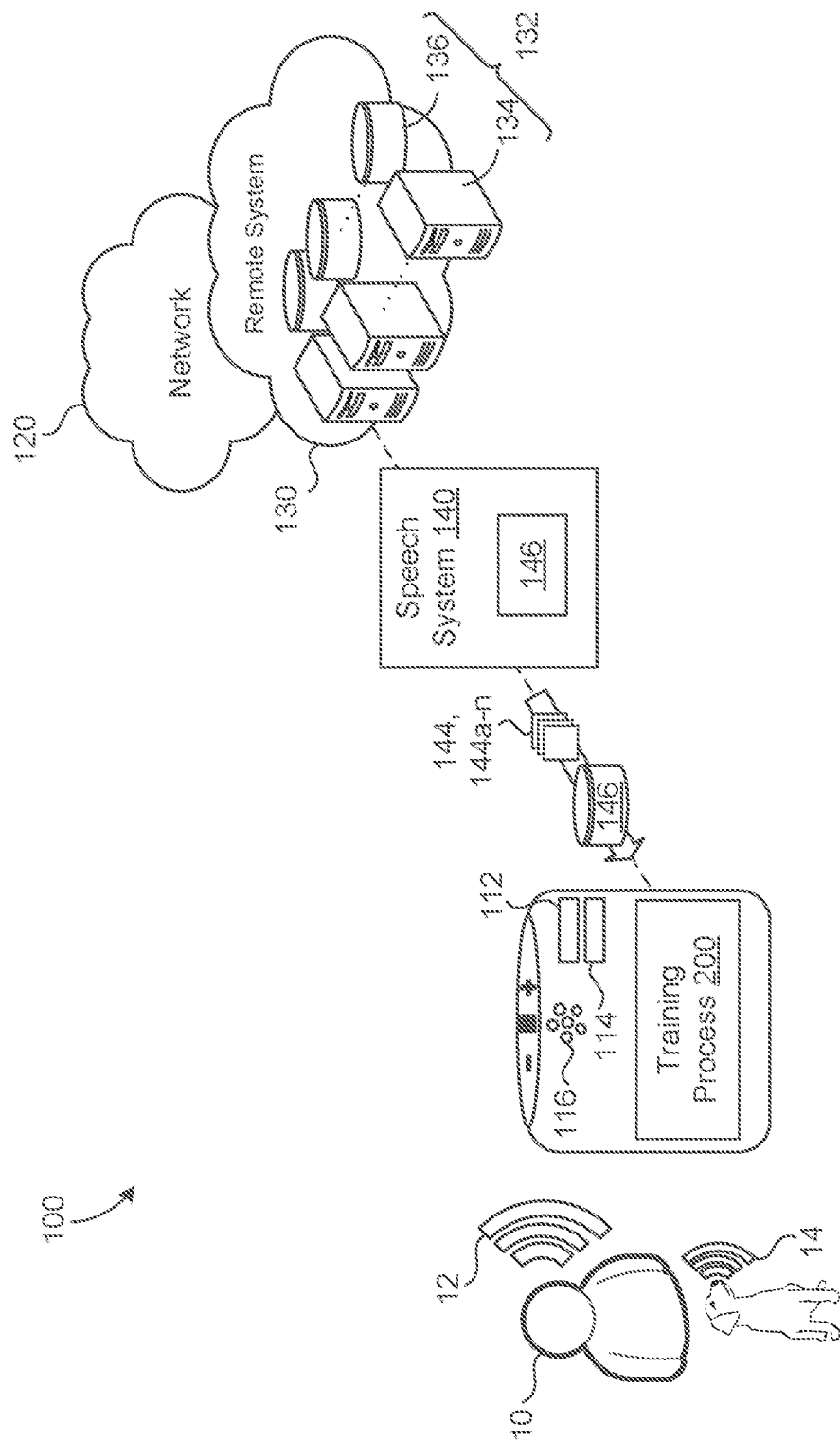
FIG. 1A is a schematic view of an example speech environment for training a speech model with noisy audio data.

As computing devices have become ubiquitous with everyday tasks, it has also become common for these computing devices to be outfit with technology that engages or promotes interaction between a user of the computing device and the computing device itself. One more common approach is an approach where the user engages with a computing device using his or her voice. In this sense, various computing devices (also referred to as voice-enabled devices) are configured to process a speech-based input and to perform operations or tasks based on the speech-based input. For instance, the user may interact with a voice-enabled device with the expectation that the device generates synthesized speech as a response or executes a task from a spoken request (also referred to as a query or command).

To illustrate, the user may submit a query to the voice-enabled device by saying "play my morning jazz playlist," and expect the device to play a song from the user's morning jazz playlist. Since speech is a primary form of human communication, speech-based inputs are a natural and a convenient way to communicate with a device that can be performed in almost any context (e.g., completely hands free).

In order to process a speech-based input, a computing device is configured with speech recognition capabilities. One challenge for these speech recognition systems is that to accurately recognize speech that likely results in a favorable user experience, a speech recognition system needs to be able to handle speech inputs from a wide range of spoken variation and often with some degree of background noise. In other words, a robust speech recognition system can accurately distill the context of speech spoken by a user even though the speech from that particular user includes, for example, dialectal differences (e.g., accents, diction, word stress emphasis, vocabulary variance, etc.) when compared to another user also using the same speech recognition technology.

Furthermore, a voice-enabled device may include some degree of speech-based personalization. To illustrate, a single voice-enabled device may be used by multiple users in the same environment. For example, the voice-enabled device belongs to a family of three that includes a father, a mother, and a teenage son. Here, the teenage son may be a bit of a practical joker and try to modify a default hotword associated with the device that activates the device from a sleep state to a state that performs speech processing (i.e., to wake up the device to listen for speech commands or queries). For instance, the son changes the default hotword of "Hey Google," to the hotword phrase "Hey Mike," thinking it will be funny that his dad will get frustrated when the device is not listening to him. Unbeknownst to the son, the device may be configured such that each user of the device or registered user has a speaker profile associated with the device. In this example, the device may have a speech model (e.g., a speech recognition model or hotword model) that is particular to the son. With this being the case, the son may fail to realize that the device recognized the son's voice when the son changed the hotword and therefore the device actually changed the hotword configuration of the son's profile instead of changing a hotword associated with the father's profile. Therefore, the son will be confused when his father interacts with the device in a frustration-free manner using the default hotword "Hey Google." The joke may then completely backfire when the son forgets the hotword phrase "Hey Mike" and gets frustrated when the device ignores him as he repeats the phrase, "Hey Google."

Unfortunately, to have a speech model that understands the speech of a particular user among other users, the speech model needs to be trained on audio training data (e.g., recorded speech data) corresponding to the voice of the user. Moreover, the robustness of a model for the particular user is generally based upon the amount of audio training data that includes the voice of the user. In other words, a speech model that learns characteristics and/or features of the voice of the user needs samples of the user's voice to identify those characteristics and to ensure that they can be repeatedly and/or reliably identified when the user speaks to the voice-enabled device.

In one approach, a standard speech model may learn to recognize a speaker generally using a large corpus of training samples corresponding to human speech. After the standard speech model is trained on speech generally, a secondary process may further refine the standard speech model for a particular user by training the standard speech model on user-specific audio samples. This secondary process is sometimes referred to as fine-tuning because the process takes a coarsely trained model (i.e., the standard speech model) and tunes this coarsely trained model to more accurately perform speech processing for user-specific speech.

The process of fine-tuning may occur locally, meaning at the voice-enabled device itself, or remotely, meaning at a location remote from the voice-enabled device (e.g., a remote server). A user may take advantage of a local fine-tuning process when the user-specific audio samples reside locally on-device (i.e., on the voice-enabled device) instead of residing in remote storage. When the user-specific audio samples reside locally, a fine-tuning process on-device is efficient in that the user-specific audio samples do not need to be communicated to a remote system in order to perform the fine-tuning process. This may avoid local resource consumption to communicate the user-specific audio samples to the remote system. Moreover, a user may prefer to retain ownership (e.g., based on privacy concerns) of his or her user-specific audio samples instead of surrendering them to a remote service to perform fine-tuning; alleviating potential privacy concerns or potential user data abuse.

One example of a local approach to fine-tuning is federated learning. Federated learning refers to a process where a centralized source (e.g., remote server or some coordinating device) exists, but each user-specific device retains its own learning autonomy; and thus user-data autonomy. With federated learning, a voice-enabled device collaboratively learns a shared prediction model while keeping all of its own training data on-device. In other words, a machine learning process using fine-tuning is decoupled from the need for remotely stored data. In some examples, the process of federated learning entails the voice-enabled device downloading a current speech model (e.g., a coarsely trained, standard speech model) and improving it by learning from audio data on the device. Here, the audio data on the device is user-specific audio samples. In some examples, once the fine-tuning process of federated learning occurs on-device, the device communicates any updates made to the current speech model (e.g., the coarsely trained, standard speech model) to the centralized source. For instance, the device sends a model gradient update to the centralized source through privacy preserving optimization methods (e.g., via encrypted communication). With each device deploying the speech model, each device may contribute an update for the current speech model from the fine-tuning process to the centralized source, such that the centralized source can aggregate all of the updates across all devices to improve the current model while maintaining the updated model as a shared model for all devices. The federated learning process may also maintain privacy for the updates communicated to the centralized server by immediately combining update(s) from one device with updates from another device (e.g., averaging updates together) to obscure potentially unique updates from any single device.

Although fine-tuning provides another layer of speech personalization, a fine-tuning process inherently demands a large amount of speech data on a per user basis to ensure its accuracy. For instance, some neural network-based models demand dozens of hours of recorded speech to result in high fidelity models specific to a single user. Yet there are inevitable circumstances where a large amount of recorded speech data is not available nor publicly accessible for training the speech model. This makes it difficult to fine-tune a model for each user. Another complication is that some users may infrequently interact with the voice-enabled device. With infrequent interaction, even on-device learning techniques may not be able to gather a large enough amount of data to train an accurate model for a particular user. Furthermore, even when the voice-enabled device of the user gathers user-specific audio samples, these user-specific audio samples may include noisy data where background noise (e.g., speech from other users) other than the voice of the user is present. Some approaches may try to cancel or filter the background noise as a tactic to isolate the speech for the particular user in the audio data at the cost of additional processing resources.

To overcome a limited amount of speech samples containing the user's voice to personalize the speech model, the fine-tuning process may leverage noisy data available to the voice-enabled device to better personalize the speech model to the environment of the user. By utilizing the noisy data available to the voice-enabled device, the speech model may train with some form of the noisy data to enable the speech model to be more robust to the types of noise that are typically encountered by the voice-enabled device of the user. Furthermore, rather than attempting to remove noisy data included in an audio sample, the training process may use this noise as an additional means of identification for the user and/or their environment. In other words, this noisy data training approach may improve speech recognition accuracies without the need for any labeled data or frequent user interactions. Another advantage to this approach is that training with noisy data may be easily incorporated into fine-tuning processes such as on-device speech personalization and/or federated learning.

Figure 1B:
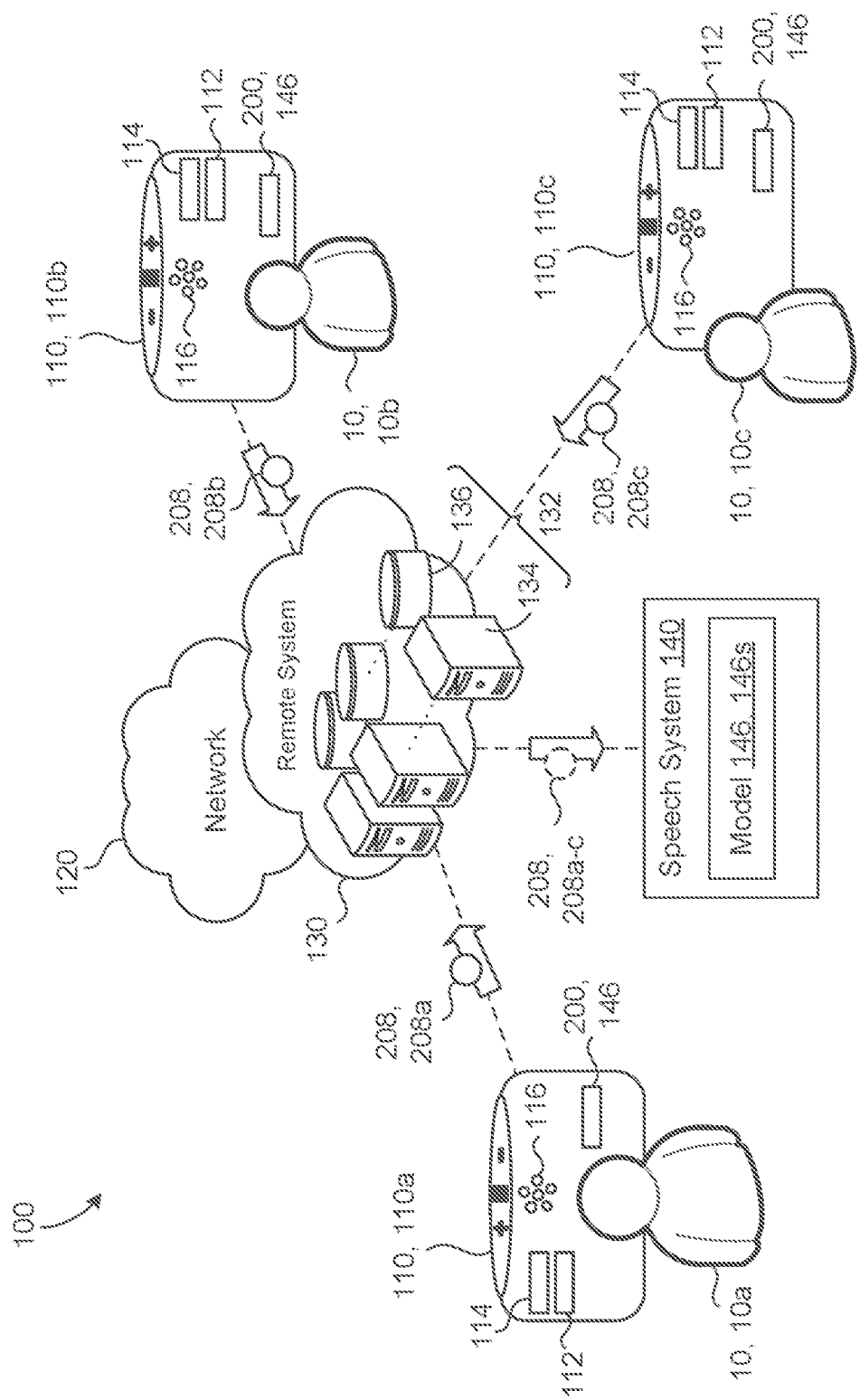
FIG. 1B is a schematic view of an example speech environment for training a speech model using federated learning with noisy audio data.

Referring to FIGS. 1A and 1B, in some implementations, the speech environment 100 includes a user 10 communicating a spoken utterance 12 to a voice-enabled device 110 (also referred to as a device 110 or a user device 110). The user 10 (i.e., speaker of the utterance 12) may speak the utterance 12 as a query or a command to solicit a response from the device 110 or to have the device 110 execute a task based on the content of the utterance 12. The device 110 is configured to capture audible sounds from one or more users 10 within the speech environment 100. The audible sounds may refer to a spoken utterance 12 by the user 10 that functions as an audible query, a command for the device 110, or an audible communication captured by the device 110. The audible sounds may further include environment noise 14 captured at the device 110 based on the audio capturing sensitivity of the device 110. A speech-enabled interface (e.g., a digital assistant) may field the query or the command by answering the query and/or causing the command to be performed.

Here, the device 110 is configured to capture audio data corresponding to utterances 12 and/or noise 14 within the environment 100 about the device 100. Here, the audio data may characterize a spoken utterance 12, environmental noise 14, or some combination of both. The device 110 may correspond to any computing device associated with the user 110 and capable of receiving audio signals. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech processing.

The device 110 further includes an audio subsystem with an audio capturing device (e.g., an array of one or more microphones) 116 for capturing and converting audio data 12, 14 within the speech environment 100 into electrical signals. While the device 110 implements the audio capturing device 116 in the example shown, the audio capturing device 116 may not physically reside on the device 110, but be in communication with the audio subsystem (e.g., peripherals of the device 110). For example, the device 110 may correspond to a vehicle infotainment system that leverages an army of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing. For instance, the device 110 is configured to execute a training process 200 to train a speech model 146 to be personalized for a user of the device 110. These systems 140, 200 may reside on the device 110 (referred to as on-device systems), reside remotely (e.g., reside on the remote system 130), but in communication with the device 110, or some combination thereof. For example, FIG. 1B illustrates the remote system 130 functioning as a centralized server that implements the speech system 140 such the speech model 146 associated with the speech system 140 may be shared between multiple devices 110, 110a-n (e.g., shown as devices 110, 110a-c). In some implementations, it is advantageous for the speech system 140 to reside on the remote system 130 to enable the speech system 140 to initially train the speech model 146 on a large corpus of training data (e.g., training speech utterances) accessible to the remote system 130 (e.g., stored in the remote memory hardware 136). This enables the initial training of the model 146 to leverage more powerful computing resources available at the remote server that may not be available at the voice-enabled device 110. The speech system 140 may, however, execute locally on the device 102 to initially train the speech model 146 on the device 102 without requiring the remote system 130.

In contrast, the training process 200 executes locally on each of the user devices 110 and is configured to generate user-specific training samples of audio for each respective user 10. To generate user-specific noisy audio samples for a respective user 10, the training process 200 uses audio data 12, 14 captured within the environment 100 of the device 110 to augment a fixed set of training utterances 144, 144a-n received from the speech system 140. By executing the training process 200 locally to generate the user-specific noisy audio samples, the audio data 12, 14 captured from the environment of the user 10 is kept on the voice-enabled device 110 and not shared with the remote system 130.

The initial fixed set of training utterances 144, 144a-n refer to transcribed speech representations sampled from a number of different speakers (i.e., an assortment of speakers). The speech representations may be in raw audio form, a form corresponding to feature representations (e.g., mel filterbank energies or micro features), or some type of intermediate feature for a respective speech model. In some examples, the training utterances 144 are from some publicly available dataset. Each training utterance 144 includes a transcription 144t (FIGS. 2A and 2B) of the words spoken in the utterance 144 paired with a corresponding speech representation 144r (FIGS. 2A and 2B) of the utterance 144. A speech representation 144r of the utterance 144 may refer to any manner of representing speech characteristics or features contained in the utterance 144. For instance, the speech representation 144r may include an embedding or vector string where each dimension of the embedding represents one or more speech characteristics. In some examples, the transcription 144t of each training utterance 144 is generated manually (e.g., hand-transcribed utterance) to help ensure a level of accuracy for speech model 146.

The speech system 140 may be configured to generate various types of speech models 146 depending on the speech processing to be performed at the user device 110. Some examples of speech models 146 include a hotword model, a speech recognition model, and/or an endpointing model. A hotword model is a model trained to detect whether a particular word or phrase is present in audio data characterizing a spoken utterance 12 without performing speech recognition on the audio data. When the particular word or phrase is present, the hotword model is configured to wake-up various speech processing systems. In other words, a "hotword" refers to a particular word or phrase that when detected by the hotword model triggers activation of one or more speech processing systems to process the hotword and/or one or more other terms that follow the hotword in the spoken utterance 12. When the speech system 140 trains a hotword model 146, the training utterances 144 include labels indicating whether the hotword is present in a particular training utterance 144 (e.g., a positive training utterance 144) or not (e.g., a negative training utterance 144). Here, each positive training utterance 144 includes a corresponding speech representation 144r that characterizes the hotword while each negative training utterance 144 includes a corresponding speech representation 144r that does not characterize the hotword. The speech representations 144r may be paired with corresponding transcriptions 144r or unpaired.

On the other hand, a speech recognition model refers to a speech model 146 trained to recognize terms in input audio data characterizing a spoken utterance 12 to generate a transcription of the utterance 12 that may be displayed and/or interpreted to identify a command or query conveyed by the spoken utterance. For instance, when the voice-enabled device 110 captures the utterance 12 "what is the weather like today?" spoken by the user 10, a speech recognition model is configured to process audio data characterizing the utterance 112 to interpret the terms in order to determine that the user 10 is requesting a report of the current weather.

In some examples, training a speech recognition model includes using a gradient descent optimization algorithm with a loss function or loss term in an iterative process that updates model parameters (e.g., model weights) to minimize the loss function/term. More specifically, the training process 200 may backpropagate an estimate of a gradient of a loss function to adjust current parameters of a neural network for the model. As the model parameters reduce the loss function, the model may approach an optimal state where the model 146 receives the speech representation 144r and predicts a speech recognition result that matches the corresponding transcription 144t of a given training utterance 144. In some examples, the training process 200 generates the loss term based on the predicted speech recognition result (e.g, the probability distribution over possible speech recognition hypotheses) compared to the corresponding transcription 144*t* of the training utterance 144.

With continued reference to FIGS. 1A and 1B, the user device 110 receives an untrained or pre-trained speech model 146 from the speech system 140. The speech system 140 may push the pre-trained or untrained speech model 146 to the device 110 or the pre-trained or untrained speech model 146 may be preloaded on the user device 110. The speech system 140 also communicates the fixed set of training utterances 144, 144*a-n* to the device 110. The amount of training utterances 144 in the fixed set of training utterances 144 may vary, but by way of example, fixed set of training utterances 144 may include about one-thousand utterances. Here, each training utterance 144 in the fixed set of training utterances 144 includes a corresponding transcription 144*t* paired with a corresponding speech representation 144*r*. The device 110 may further execute the training process 200 to personalize the model 146 for the specific user 10 of the device 110 by augmenting the fixed set of training utterances 144 with the noisy audio data 202 sampled from the environment 100 of the voice-enabled device 110 to fine-tune the model 146. In some examples, the training process 200 filters or uses a subset of the fixed set of training utterances 144. Here, the subset of the fixed set of training utterances 144 may correspond to some number of the fixed set of training utterances 144 that has a particular level of relevancy to the user 10 of the device 110 (e.g., the subset corresponds to utterances 144 from speakers with similar characteristics to the user 10, such as similar speech embeddings to the user 10 of the device 110). The training process 200 samples the noisy audio data 202 from the environment 100 of the voice-enabled device 102, and for each training utterance 144 in the fixed set of training utterances, the training process 200 uses the noisy audio data 202 to augment the corresponding speech representation 144*r* to generate one or more corresponding noisy audio samples 204. Here, each of the one or more corresponding noisy audio samples 204 generated for the corresponding training utterance 144 may be paired with the same corresponding transcription 144*t* of the corresponding training utterance 144. Accordingly, the training process 200 is capable of generating multiple noisy audio samples 202 for each speech representation 144*r* in the fixed set of training utterances 144, such that each of the noisy audio samples 204 incorporates noisy audio data 202 unique to the environment 100 of the voice-enabled device 110. Lastly, to personalize the speech model 146, the training process 200 trains the untrained or pre-trained speech model 146 on the one or more corresponding noisy audio samples 204 generated from each speech representation 144*r* in the fixed set of training utterances 144.

The training process 200 operates on the premise that, although none of the training utterances 144 in the fixed set of training utterances 144 are spoken by the user 10 and the number of training utterances 144 is not sufficient for robust model training, the number of these training utterances 144 can be multiplied by augmenting each speech representation 144*r* one or more times using noisy audio data 202 collected from the environment 100 of the user device 110 to provide a sufficient number of personalized training utterances 144 for robustly training the speech model 146. The training process 200 may collect the noisy audio data 202 by sampling any audible sounds detectable by the audio capturing device 116 at the device 110. Here, the noisy audio data 202 may not include the voice of the user 10, but yet the noisy audio data 202 is considered user-specific because the noisy audio data 202 corresponds to audible noises that may be unique to the environment of the user 10 and therefore be associated with noises that the user device 102 will typically encounter when the user 10 is speaking. As shown in FIG. 1A, the user 10 may have a dog that generates unique sounds as background noise 14 when the user 10 interacts with the device 110. For example, the dog may howl, bark, or whine when the user 10 communicates a voice command to the device 110. By collecting the background noise 14 that includes the noises made by the user's dog, the training process 200 may form user-specific noisy audio samples 204. Further, the user 10 may also live near a railroad crossing such that the training process 200 collects noisy audio data 202 associated with train horns, railroad warnings, and sounds produced by trains traveling along train tracks.

With a collection of noisy audio data 202, the training process 200 may augment an original training utterance 144 with the noisy audio data 202 to generate one or more noisy audio samples 204 that are user-specific because they contain noisy audio data 202 specific to the environment of the user 10. By augmenting a plurality of training utterances 144 with noisy audio data 202, the training process 200 may generate a sufficient number of noisy audio samples 204 for use in training the speech model 146. Based on this augmentation process, the training process 200 is capable of generating a large number of noisy audio samples 204 from a limited fixed number of original training utterances 144, such that the noisy audio samples 204 are permutations of one or more sample of noisy audio data 202 combined with one or more training utterance 144 from the fixed set of training utterances 144. The training process 200 may be deployed as a fine tuning process to generate a personalized speech model 146 at the user device 110 (e.g., as shown in FIG. JA) or to contribute to a shared speech model 146 available in a centralized location to multiple device 110 (e.g., as shown in FIG. 1B).

Referring specifically to FIG. 1B, when the federated learning approach uses the training process 200 executing on a population of user devices 110, the device 110 receives the pre-trained model 146 and the fine-tuning process uses the training process 200 to generate an update 208 to the model 146 that is then communicated back to the centralized location to form a shared model 146, 146*s*. Here, the update 208 is generated in response to the training process 200 that trains the model 146 on the user-specific noisy audio samples 204. Accordingly, each device 110 contributes a different user-specific update 208 based on the respective user-specific noisy audio samples 204 so that the remote system 130 may use federated learning to incorporate all the user-specific updates 208 into the shared model 146*s*. In an example where the shared speech model 146*s* includes a speech recognition model, the speech recognition model is capable of recognizing speech across a wide-range of noisy environments. FIG. 1B illustrates three devices 110*a-c* where each device 110 belongs to a respective user 10, 10*a-c*. Each device 110 may execute the training process 200 separately to generate a respective device-specific update 208 by training the untrained or pre-trained model 146 on the user-specific noisy audio samples 204. In the example shown, the training process 200 executing on each device 110*a*, 110*b*, 110*c* generates a respective device-specific update 208*a*, 208*b*, 208*c* for transmission back to the speech system 140 and applied through federated learning to generate the shared speech model 146*s*. In some examples, the updates 208 include model parameters (e.g., model weights) and/or some representation of the loss term after training the speech model 146 on the user-specific noisy audio samples 204. Based on all of the updates 208 that the speech system 140 receives, the speech system 140 generates a shared model 146s that to some degree incorporates the updates 208.

Although not shown, the training process 200 may train a single model 146 that is shared to multiple devices 110 owned or accessible to the user 10. For example, the user 10 owns a smart watch, a smart phone, and a smart speaker for a total of three devices 110 associated with the user 10. Here, the training process 200 may collect samples of noisy audio data 202 from each device 110 associated with the user 10. With these samples of noisy audio data 202 from each device 110, the training process 200 may train a model 146 that is shared between these devices 110 to understand the speech of the user 10. Specifically, the training process 200 augments one or more training utterance 144 from the fixed set of training utterances 144 with one or more samples of noisy audio data 202 to form noisy audio samples 204 to train the model 146 that will be shared among the devices 110 of the user 10. In other words, this approach is similar to a federated learning approach that occurs for devices 110 associated with the user 10.

Figure 2A:
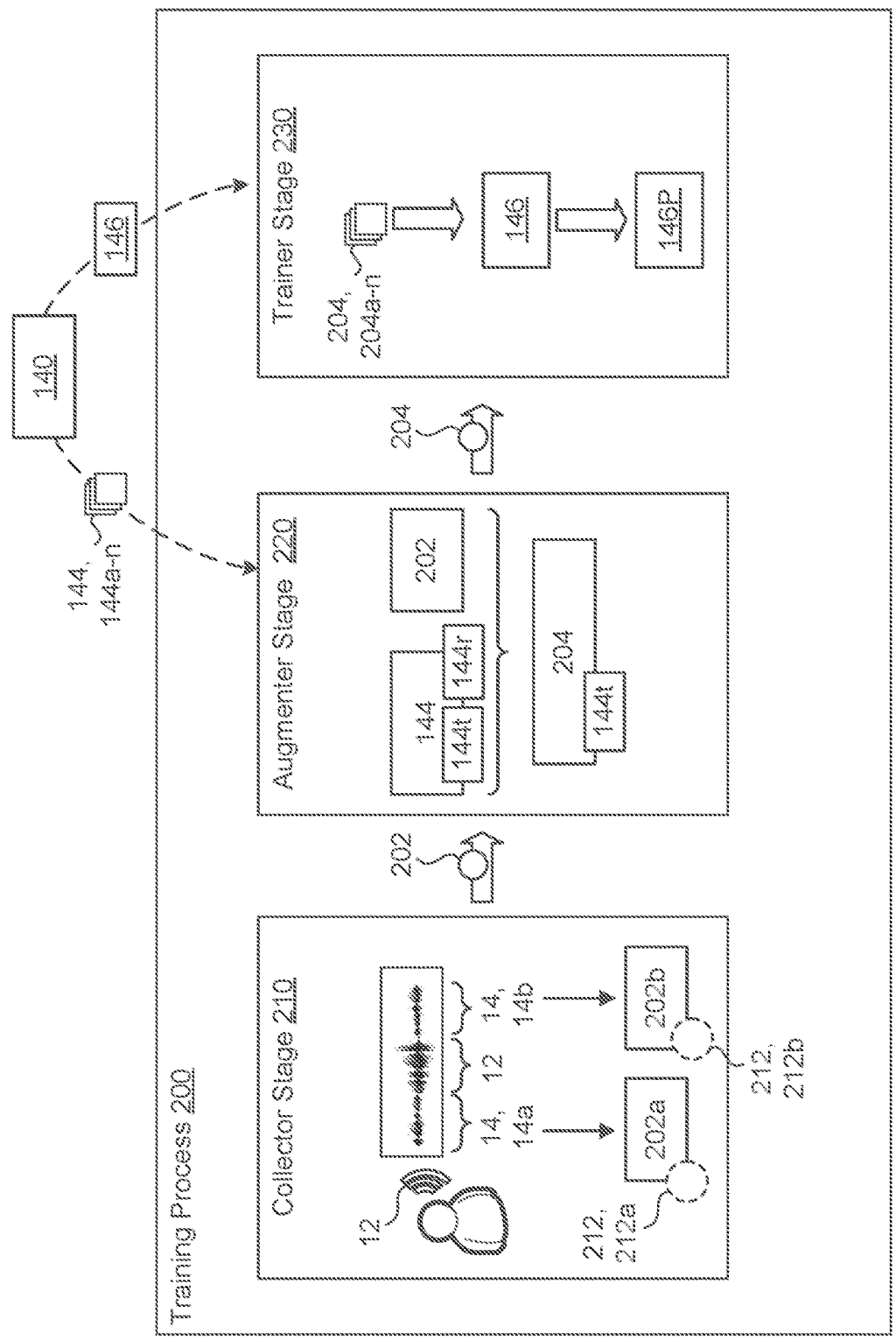
FIGS. 2A and 2B are schematic views of example augmentations systems for a speech environment.
Figure 2B:
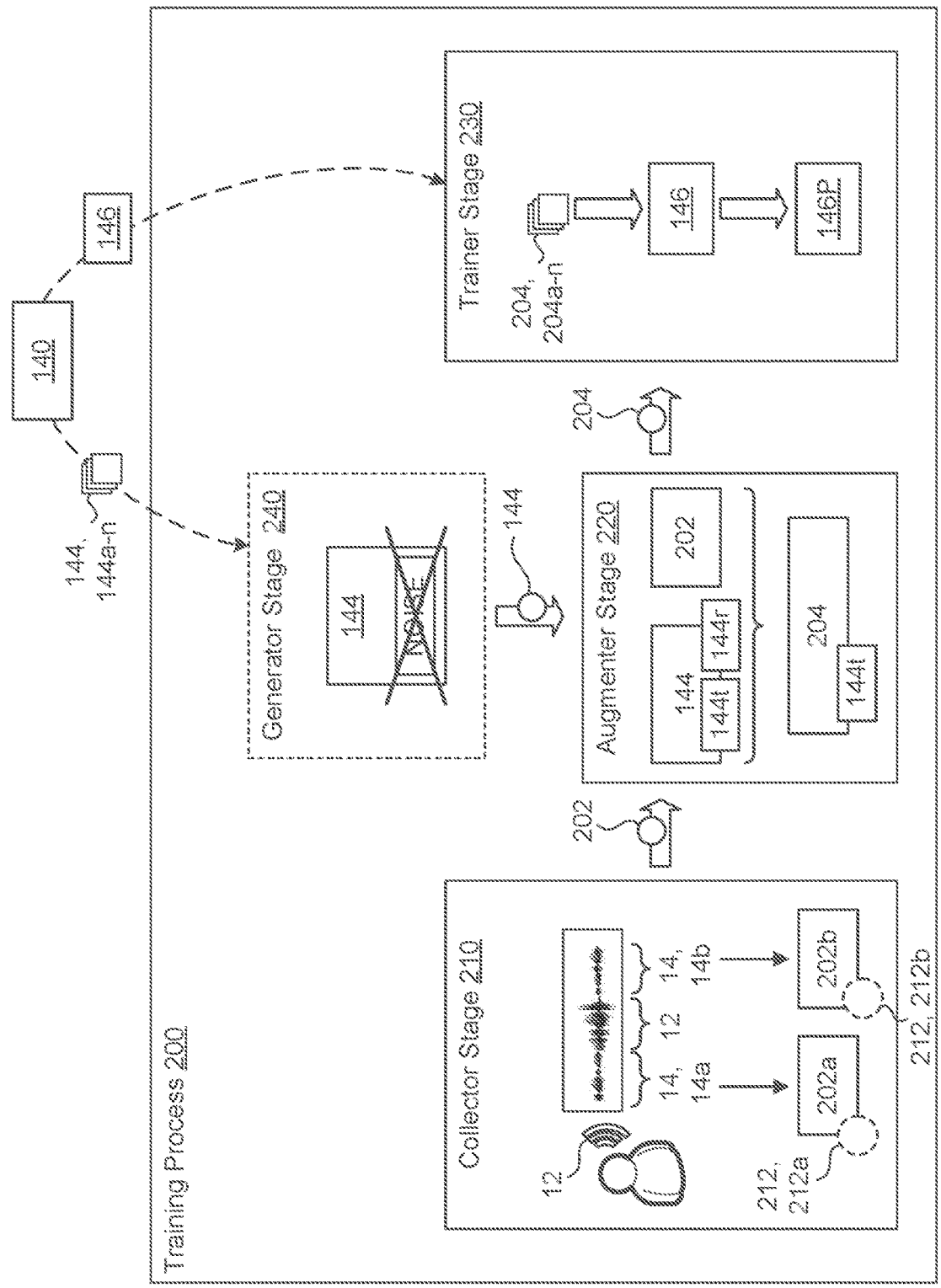

Referring to FIGS. 2A and 2B, the training process 200 includes a collection stage 210, an augmentation stage 220, and a training stage 230. The collection stage 210 is configured to collect environment noise 14 to generate samples of noisy audio data 202. In some examples, a digital signal processor of the data processing hardware 112 of the device 110 functions as the collection stage 210 for the training process 200. The collection stage 210 may collect any audible noise in the environment 100 that is within a detectable range of the audio capturing device 116. The collection stage 210 may be configured to collect environment noise 14 in a variety of manners. In one approach, the collection stage 210 collects environment noise 14 based on the type of model 146 that is being fine-tuned using the training process 200. To illustrate, when the training process 200 is fine-tuning a pre-trained hotword model to better personalize the hotword model to the environment 100 of the device 110 implementing the hotword model, the collection stage 210 may be configured to collect environment noise 14 by sampling noise 14 during times (e.g., time windows) when a user 10 interacts with the device 110. For example, the collection stage 210 collects samples of noisy audio data 202 for a period of time immediately before, during, or immediately after speech interactions between the user 10 and the device 110. For a hotword model specifically, the time immediately before or immediately after a hotword is spoken in an utterance 12 by the user 10 may be a beneficial time to sample the background noise 14 to generate noisy audio data 202 FIG. 2A illustrates the collection stage 210 collecting background noise 14, 14a immediately before the spoken utterance 12 to generate a first sample of noisy audio data 202, 202a and background noise 14, 14b immediately after the spoken utterance 12 to generate a second sample of noisy audio data 202, 202b In contrast, when the model 146 is a speech recognition model, the collection stage 210 may try to sample the background noise 14 during a spoken interaction between the user 10 and the device 110.

In some implementations, the collection stage 210 is additionally configured to collect audio samples that are similar to a particular training utterance 144 in the fixed set of training utterances 144 received from the speech system 140. To collect audio samples that are similar to a particular training utterance 144, the collection stage 210 may sample spoken utterances 12 at the device 110 and determine whether the spoken utterance 12 has a phonetic similarity to the particular training utterance 144. In order to make this determination, the collection stage 210 may compare an embedding for the spoken utterance 12 with an embedding (e.g., speech representation 144r) for the training utterance 144 (e.g., by using an embedding model). In some examples, the collection stage 210 works in conjunction with an embedding model associated with the speech model 146 (e.g., an acoustic model (AM) associated with the speech model 146) to perform this embedding comparison for phonetic similarity. In some configurations, the collection stage 210 includes a phonetic similarity threshold (e.g., an adjustable phonetic similarity threshold) that identifies a minimum distance between the training utterance 144 and a collected audio sample in order to be considered phonetically similar. By having a phonetic similarity threshold, the collection stage 210 may avoid potential complications where a negative training sample actually becomes designated as a hard-to-recognize positive sample due to phonetic similarity. As an example, a hotword model being trained to detect the hotword "Hey Google" has a negative training example of "Hey Computer" that may be falsely detected by the hotword model. In this example, the collection stage 210 may identify some degree of phonetic similarity between "Hey Google" and "Hey Computer," but the distance between these phrases does not satisfy the phonetic similarity threshold. In this example, failing to satisfy the phonetic similarity threshold means that these two phrases are not similar enough such that "Hey Computer" should be identified as a hard-to-recognize positive example of "Hey Google."

In some configurations, the collection stage 210 collects one or more samples of background noise 14 to form the noisy audio data 202 when the collection stage 210 determines either some context and/or time window when a user 10 of a device 110 frequently interacts with the device 110. For instance, the device 110 is located in the home of a first user 10. During the work-week (e.g., Monday through Friday), the user 10 tends to frequently interact with the device 110 before the start of the work-day (e.g., between 6 am and 8 am) and then after the work-day ends (e.g., between 6 pm and 10 pm). Here, on Mondays through Fridays, the collection stage 210 may collect a greater number of samples of background noise for the time window of 6 am-8 am and 6 pm-10 pm than the time window of 8 am-6 pm. As a different example, a second user 10 may be a traveling salesperson who tends to use an assistant application on his or her device 110 to navigate to different customers or to place sales calls. This means that the user 10 most frequently interacts with the device 110 using his or her voice during the work-day between the hours of 9 am and 5 pm. When the collection stage 210 either determines these times (e.g., time window) and/or contextual patterns of interaction behaviors, the collection stage 210 may be configured to collect samples of the background noise 14 during these periods of frequent interaction.

Additionally or alternatively, the collection stage 210 may be configured to randomly sample background noise 14 within the environment 100 of the device 110. In some instances, when the collection stage 210 randomly samples noisy audio data 202 in the environment 100, the collection stage 210 may apply weights 212 to one or more samples of noisy audio data 202 when a sample coincides with an interaction of the user 10 with the device 110. For example, FIGS. 2A and 2B illustrates that a first weight 212, 212a may be associated with the first sample of noisy audio data 202a while a second is weight 212, 212b may be associated with a second sample of noisy audio data 202b. As an example of when the collection stage 210 applies a weight 212, the collection stage 210 applies a weight to a sample of noisy audio data 202 when the sample occurs at a time when the user 10 frequently interacts with the device 110. For instance, when the collection stage 210 collects a random sample of noisy audio data 202 during the hours of 6 am and 8 am for the first user 10 discussed above, the collection stage 210 applies a weight 212 to the random sample of noisy audio data 202 in order to identify that the sample is more likely to be relevant when training the model 146.

The augmentation stage 220 is configured to generate the one or more noisy audio samples 204 for each speech representation 144r in the fixed set of training utterances 144. The augmentation stage 220 generates each noisy audio sample 204 by combining noisy audio data 202 sampled by the collection stage 210 with the speech representation 144r of a corresponding training utterance 144. Here, the noisy audio sample 204 may be formed from a single sample of noisy audio data 202 or multiple samples of noisy audio data 202 collected at the collection stage 210 such that a single noisy audio sample 204 may be constructed from any number of samples of noisy audio data 202 mixed together at once. For instance, a first sample of noisy audio data 202 corresponding to a dog barking may be mixed together with a second sample of noisy audio data 202 corresponding to a baby crying and then combined with a training utterance 144 from the fixed set of training utterances 144 to form a single noisy audio sample 204. The augmentation stage 220 may randomly mix noisy audio data 202 with training utterances 144 or mix noisy audio data 202 with training utterances 144 in a systematic manner. As discussed briefly above, the augmentation stage 220 may filter or modify training utterances 144 from the fixed set of training utterances 144 when forming the noisy audio samples 204. This may include slicing or cropping a training utterance 144 when combining a training utterance 144 with one or more samples of noisy audio data 202.

Once the augmentation stage 220 generates the noisy audio sample 204, the augmentation stage 220 may pair the noisy audio sample 204 with the corresponding transcription 144t of the training utterance 144 that is paired with the speech representation 144r augmented by the noisy audio data 202. In other words, the newly formed noisy audio sample 204 may assume the label of the underlying training utterance 144. To illustrate, if a training utterance 144 is labeled as a positive training example for training a hotword model, when the corresponding speech representation 144r for that training utterance 144 is augmented by the noisy audio data 202 to form the noisy audio sample 204, the noisy audio sample 204 will also be a positive training example that additionally incorporates background noise 14 specific to the device 110 of the user 10. Since the substance of the positive training example of the hotword remains unchanged, the label for the training utterance 144 persists for the noisy audio sample 204. The same concept applies analogously to transcriptions 144t corresponding to training utterances 144. For example, each of the one or more noisy audio sample 204 generated for a speech representation 144r may assume the corresponding transcription 144t that is paired with that speech representation 144r as a ground-truth label for training the speech recognition model.

The training stage 230 receives the noisy audio samples 204, 204a-n from the augmentation stage 220 for use in generating a personalized speech model 146P. In some examples, the training stage 230 locally caches the noisy audio samples 204 and the untrained or pre-trained speech model 146 on the device 110 (e.g., in memory hardware 114 of the device 110). The training stage 230 performs the fine tuning of the speech model 146 to form the personalized speech model 146P. The training stage 230 may use the noisy audio samples 204 to fine-tune the speech model 146 through the use of techniques such as gradient descent where the training stage 230 iteratively generates a loss term and updates parameters to provide the personalized speech model 146P.

In some configurations, such as FIG. 2B, the training process 200 also includes a de-noising stage 240 that is configured to de-noise training utterances 144 in the fixed set of training utterances 144 from the speech system 140. De-noising refers to a process of removing existing noise. By removing existing noise, the de-noising stage 240 may help to ensure that the background noise 14 that the augmentation stage 220 uses to generate the noisy audio samples 204 is not confused with noise associated with one or more training utterances 144. In other words, if the de-noising stage 240 does not remove existing noise within one or more training utterances 144, the existing noise may propagate errors during the training stage 230 that may potentially compromise the training effectiveness of the noisy audio samples 204 for generating the personalized speech model 146P. Moreover, since the training utterances 144 are unlikely to be utterances 12 spoken by the user 10 of the device 110, the existing noise may be falsely construed or weighted as being user-specific. When removing existing noise, this removal by the de-noising stage 240 may occur prior to the augmentation stage 220 such that the generator 220 de-noises the training utterances 144 before the augmentation stage 220 combines training utterances 114 with the noisy audio data 202 to form the noisy audio samples 204. Otherwise, the generator 230 may have difficulty isolating noise from a training utterance 144 when background noise 14 has also been introduced with the noisy audio data 202.

In some implementations, the training process 200 further implements a machine learning model that learns how to best generate noise for a particular training utterance 144 based on noisy audio data 202 collected by the collection stage 210. In these implementations, the machine learning model operates as a noise generator in conjunction with the augmentation stage 220 to generate noisy audio samples 204 that are optimized for use as training examples for generating the personalized speech model 146P. This functionality of learning to generate noisy audio samples hinges on the fact that particular types of background noise 14 may be more unique to the user's environment than others.

Figure 3:
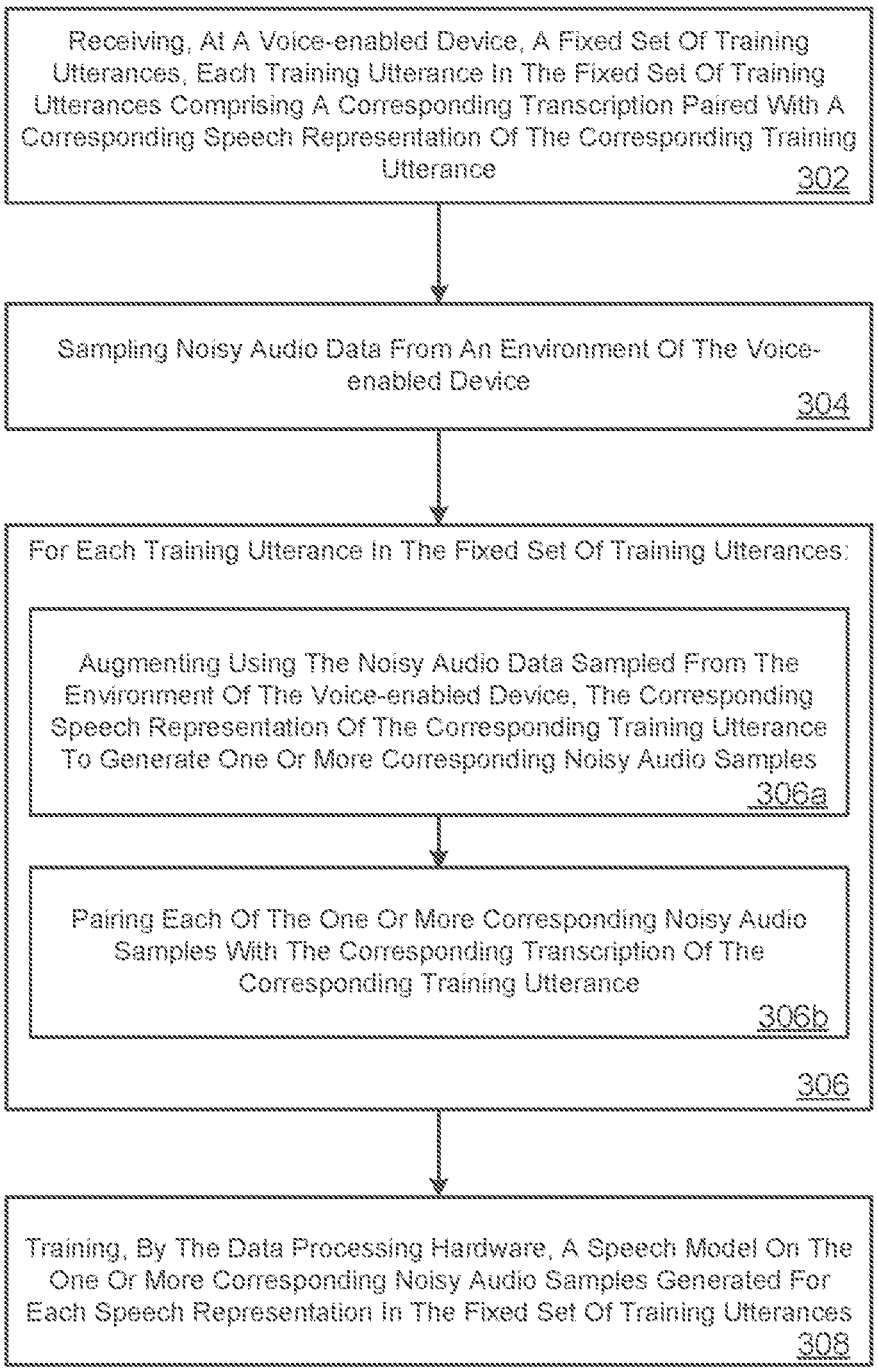
FIG. 3 is a flow chart of an example arrangement of operations for a method of training a speech model.

FIG. 3 is a flowchart of an example arrangement of operations for a method 300 of training a speech model 146. At operation 302, the method 300 receives, at a voice-enabled device 110, a fixed set of training utterances 144, 144a-n where each training utterance 144 in the fixed set of training utterances 144, 144a-n includes a corresponding transcription 144t paired with a corresponding speech representation 144r of the corresponding training utterance 144. At operation 304, the method 300 samples noisy audio data 202 from an environment 100 of the voice-enabled device 100. For each training utterance 144 in the fixed set of training utterances 144, 144a-n, the method 300 performs operations 306, 306a-b. At operation 306a, the method 300 augments, using the noisy audio data 202 sampled from the environment 100 of the voice-enabled device 110, the corresponding speech representation 144r of the corresponding training utterance 144 to generate one or more corresponding noisy audio samples 204. At operation 306b, the method 300 pairs each of the one or more corresponding noisy audio samples 204 with the corresponding transcription 144t of the corresponding training utterance 144. At operation 308, the method 300 trains a speech model 146 on the one or more corresponding noisy audio samples 204 generated for each speech representation 144r in the fixed set of training utterances 144, 144a-n.

Figure 4:
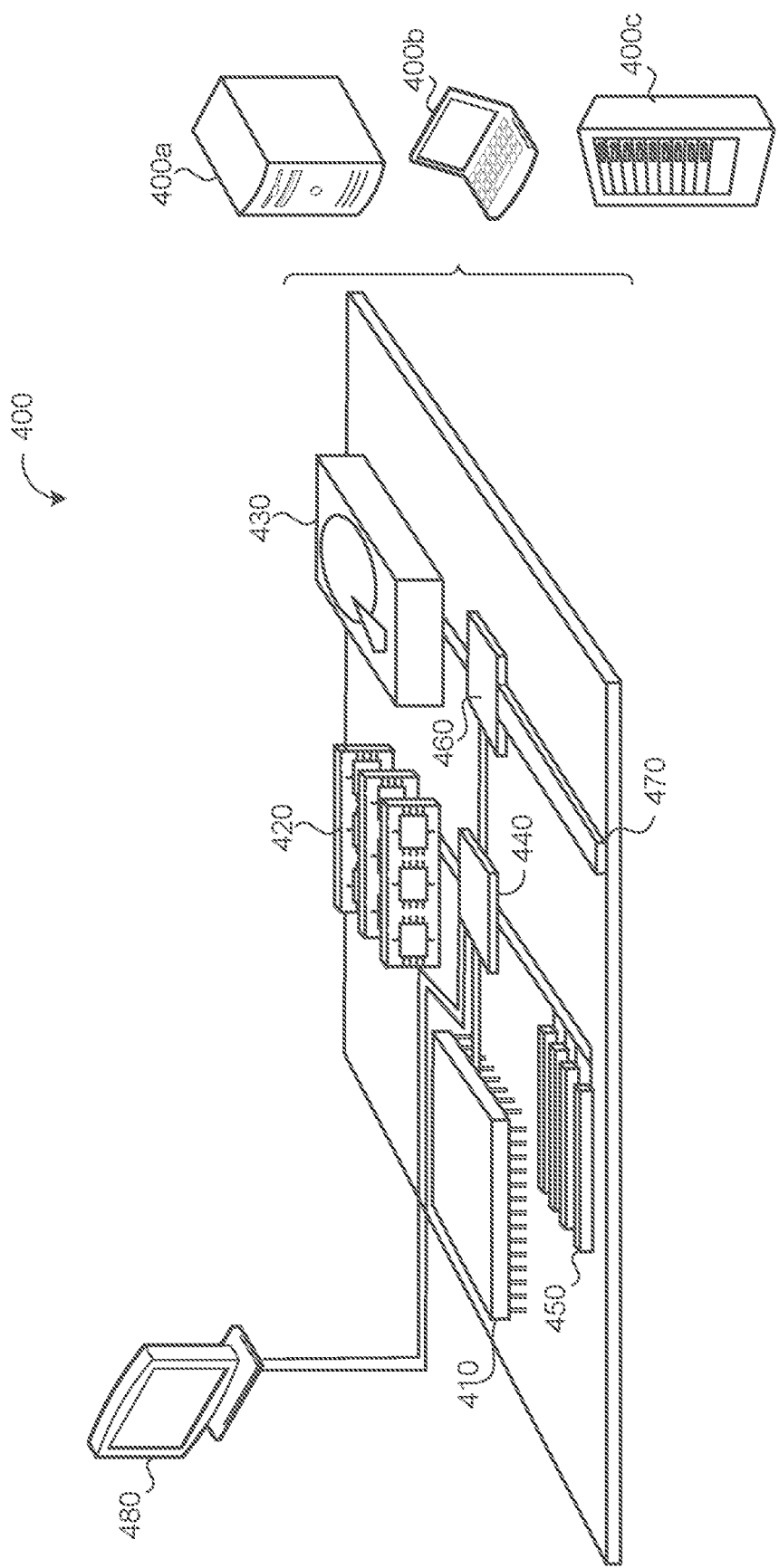
FIG. 4 is a schematic view of an example computing device that may be used to implement the systems and methods described herein.

FIG. 4 is a schematic view of an example computing device 400 that may be used to implement the systems (e.g., the speech system 140) and methods (e.g., the training process 200 and/or the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, a memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g, typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operationS. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a voice-enabled device from a remote system, a trained speech model and a fixed set of training utterances, the fixed set of training utterances used by the remote system to train the speech model for use by a plurality of voice-enabled devices, each training utterance in the fixed set of training utterances comprising a corresponding transcription paired with a corresponding speech representation of the corresponding training utterance;
   sampling, by the data processing hardware, noisy audio data from an environment of the voice-enabled device, wherein sampling the noisy audio data from the environment of the voice-enabled device comprises:
      randomly sampling the noisy audio data from the environment of the voice-enabled device throughout a day; and
      applying weights to any of the randomly sampled noisy audio data that was sampled from the environment during one or more contexts and/or time windows when a user of the voice-enabled device frequently interacts with the voice-enabled device more, the weights representing that personalizations to the speech model based on corresponding noisy audio samples are more relevant to personalization of the speech model for the voice-enabled device;
   for each training utterance in the fixed set of training utterances:
      augmenting, by the data processing hardware, using the noisy audio data sampled from the environment of the voice-enabled device, the corresponding speech representation of the corresponding training utterance to generate the one or more corresponding noisy audio samples; and
      pairing, by the data processing hardware, each of the one or more corresponding noisy audio samples with the corresponding transcription of the corresponding training utterance; and
   personalizing, by the data processing hardware, the speech model for the voice-enabled device based on the one or more corresponding noisy audio samples generated for each speech representation in the fixed set of training utterances.

2. The method of claim 1, wherein sampling the noisy audio data from the environment of the voice-enabled device comprises randomly sampling noise from the environment of the voice-enabled device at least one of immediately before, during, or immediately after speech interactions between the voice-enabled device and the user associated with the voice-enabled device.

3. The method of claim 1, wherein sampling the noisy audio data from the environment of the voice-enabled device comprises:
   identifying the one or more contexts and/or time windows when the user of the voice-enabled device frequently interacts with the voice-enabled device;
   determining that one of the one or more contexts and/or time windows when the user of the voice-enabled device frequently interacts with the voice-enabled device is occurring; and
   in response to determining that the one of the one or more contexts and/or time windows is occurring, sampling the noisy audio data from the environment of the voice-enabled device.

4. The method of claim 1, wherein a digital signal processor (DSP) of the data processing hardware samples the noisy audio data from the environment of the voice-enabled device.

5. The method of claim 1, further comprising, prior to augmenting the corresponding speech representation of the corresponding training utterance, de-noising, by the data processing hardware, the corresponding speech representation to remove any previously existing noise.

6. The method of claim 1, further comprising, when the speech model comprises a speech recognition model, for each speech representation in the fixed set of training utterances and each noisy audio sample of the one or more noisy audio samples generated for the corresponding speech representation:
   determining, by the data processing hardware, for output by the speech model, a corresponding probability distribution over possible speech recognition hypotheses for the corresponding speech representation or the corresponding noisy audio sample; and
   generating, by the data processing hardware, a loss term based on the corresponding probability distribution over possible speech recognition hypotheses for the corresponding speech representation or the corresponding noisy audio sample.

7. The method of claim 6, wherein personalizing the speech model comprises updating parameters of the speech recognition model using the loss term generated for each speech representation in the fixed set of training utterances and each noisy audio sample of the one or more noisy audio samples generated for each corresponding speech representation in the fixed set of training utterances.

8. The method of claim 6, wherein personalizing the speech model comprises:
  transmitting, to a central server, the loss term generated for each speech representation in the fixed set of training utterances and each noisy audio sample of the one or more noisy audio samples generated for each corresponding speech representation in the fixed set of training utterances,
  wherein the central server is configured to use federated learning to update parameters of a server-side speech recognition model based on:
    the loss term received from the data processing hardware of the voice-enabled device; and
    other loss terms received from other voice-enabled devices, the other loss terms received from each other voice-enabled device based on different noisy audio data sampled by the other voice-enabled devices.

9. The method of claim 1, wherein the corresponding speech representation for at least one training utterance comprises a raw audio waveform of the corresponding training utterance.

10. The method of claim 1, wherein the corresponding speech representation for at least one training utterance comprises an audio feature representation of the corresponding training utterance.

11. The method of claim 1, further comprising, for at least one training utterance in the fixed set of training utterances:
  obtaining, by the data processing hardware, a corresponding spoken utterance sampled from the environment of the voice-enabled device that:
    is phonetically similar to the corresponding speech representation of the corresponding training utterance; and
    is paired with a respective transcription that is different than the corresponding transcription that is paired with the corresponding speech representation of the at least one training utterance,
  wherein personalizing the speech model on the fixed set of training utterances and the one or more corresponding noisy audio samples is further based on the corresponding spoken utterance obtained for the at least one training utterance in the fixed set of training utterances.

12. The method of claim 11, wherein obtaining the corresponding spoken utterance for the at least one training utterance in the fixed set of training utterances comprises:
  sampling the corresponding spoken utterance from the environment of the voice-enabled device;
  determining that the corresponding spoken utterance sampled from the environment is phonetically similar to the corresponding speech representation of the at least one corresponding training utterance based on a comparison of a respective embedding generated for the corresponding spoken utterance and a respective embedding generated for the corresponding speech representation of the at least one training utterance;
  obtaining the respective transcription of the corresponding spoken utterance sampled from the environment of the voice-enabled device; and
  determining that the respective transcription of the corresponding spoken utterance is different than the corresponding transcription that is paired with the corresponding speech representation of the at least one training utterance.

13. The method of claim 12, wherein an embedding model or a portion of the speech model generates the respective embedding for each of the corresponding spoken utterance and the corresponding speech representation of the at least one training utterance.

14. The method of claim 11, wherein:
  the corresponding speech representation of the at least one training utterance represents a spoken representation of a particular fixed term;
  the speech model comprises a hotword detection model trained to detect a particular fixed term; and
  personalizing the hotword detection model to detect the particular fixed term comprises using the corresponding spoken utterance obtained for the at least one training utterance as a negative training sample.

15. The method of claim 1, further comprising, after pairing each of the one or more corresponding noisy audio samples with the corresponding transcription of the corresponding training utterance, storing, by the data processing hardware, on memory hardware in communication with the data processing hardware, the pairing of each of the one or more corresponding noisy samples with the corresponding transcription of the corresponding training utterance.

16. A system comprising:
  data processing hardware; and
  memory hardware in communication with the data processing hardware, the memory hardware storing instructions that when executed on the data processing hardware cause the data processing hardware to perform operations comprising:
    receiving, at a voice-enabled device from a remote system, a trained speech model and a fixed set of training utterances, the fixed set of training utterances used by the remote system to train the speech model for use by a plurality of voice-enabled devices, each training utterance in the fixed set of training utterances comprising a corresponding transcription paired with a corresponding speech representation of the corresponding training utterance;
    sampling noisy audio data from an environment of the voice-enabled device, wherein sampling the noisy audio data from the environment of the voice-enabled device comprises:
      randomly sampling the noisy audio data from the environment of the voice-enabled device throughout a day; and
      applying weights to any of the randomly sampled noisy audio data that was sampled from the environment during one or more contexts and/or time windows when a user of the voice-enabled device frequently interacts with the voice-enabled device more, the weights representing that personalizations to the speech model based on corresponding noisy audio samples are more relevant to personalization of the speech model for the voice-enabled device;
    for each training utterance in the fixed set of training utterances:
      augmenting, using the noisy audio data sampled from the environment of the voice-enabled device, the corresponding speech representation of the corresponding training utterance to generate the one or more corresponding noisy audio samples; and pairing each of the one or more corresponding noisy audio samples with the corresponding transcription of the corresponding training utterance; and personalizing the speech model for the voice-enabled device based on the one or more corresponding noisy audio samples generated for each speech representation in the fixed set of training utterances.

17. The system of claim 16, wherein sampling the noisy audio data from the environment of the voice-enabled device comprises randomly sampling noise from the environment of the voice-enabled device at least one of immediately before, during, or immediately after speech interactions between the voice-enabled device and the user associated with the voice-enabled device.

18. The system of claim 16, wherein sampling the noisy audio data from the environment of the voice-enabled device comprises:
identifying the one or more contexts and/or time windows when the user of the voice-enabled device frequently interacts with the voice-enabled device;
determining that one of the one or more contexts and/or time windows when the user of the voice-enabled device frequently interacts with the voice-enabled device is occurring; and
in response to determining that the one of the one or more contexts and/or time windows is occurring, sampling the noisy audio data from the environment of the voice-enabled device.

19. The system of claim 16, wherein a digital signal processor (DSP) of the data processing hardware samples the noisy audio data from the environment of the voice-enabled device.

20. The system of claim 16, wherein the operations further comprise, prior to augmenting the corresponding speech representation of the corresponding training utterance, denoising the corresponding speech representation to remove any previously existing noise.

21. The system of claim 16, wherein the operations further comprise, when the speech model comprises a speech recognition model, for each speech representation in the fixed set of training utterances and each noisy audio sample of the one or more noisy audio samples generated for the corresponding speech representation:
determining, for output by the speech model, a corresponding probability distribution over possible speech recognition hypotheses for the corresponding speech representation or the corresponding noisy audio sample; and
generating a loss term based on the corresponding probability distribution over possible speech recognition hypotheses for the corresponding speech representation or the corresponding noisy audio sample.

22. The system of claim 21, wherein personalizing the speech model comprises updating parameters of the speech recognition model using the loss term generated for each speech representation in the fixed set of training utterances and each noisy audio sample of the one or more noisy audio samples generated for each corresponding speech representation in the fixed set of training utterances.

23. The system of claim 21, wherein personalizing the speech model comprises:
transmitting, to a central server, the loss term generated for each speech representation in the fixed set of training utterances and each noisy audio sample of the one or more noisy audio samples generated for each corresponding speech representation in the fixed set of training utterances,
wherein the central server is configured to use federated learning to update parameters of a server-side speech recognition model based on:
the loss term received from the data processing hardware of the voice-enabled device; and
other loss terms received from other voice-enabled devices, the other loss terms received from each other voice-enabled device based on different noisy audio data sampled by the other voice-enabled devices.

24. The system of claim 16, wherein the corresponding speech representation for at least one training utterance comprises a raw audio waveform of the corresponding training utterance.

25. The system of claim 16, wherein the corresponding speech representation for at least one training utterance comprises an audio feature representation of the corresponding training utterance.

26. The system of claim 16, wherein the operations further comprise, for at least one training utterance in the fixed set of training utterances:
obtaining a corresponding spoken utterance sampled from the environment of the voice-enabled device that:
is phonetically similar to the corresponding speech representation of the corresponding training utterance; and
is paired with a respective transcription that is different than the corresponding transcription that is paired with the corresponding speech representation of the at least one training utterance,
wherein personalizing the speech model on the fixed set of training utterances and the one or more corresponding noisy audio samples is further based on the corresponding spoken utterance obtained for the at least one training utterance in the fixed set of training utterances.

27. The system of claim 26, wherein obtaining the corresponding spoken utterance for the at least one training utterance in the fixed set of training utterances comprises:
sampling the corresponding spoken utterance from the environment of the voice-enabled device;
determining that the corresponding spoken utterance sampled from the environment is phonetically similar to the corresponding speech representation of the at least one corresponding training utterance based on a comparison of a respective embedding generated for the corresponding spoken utterance and a respective embedding generated for the corresponding speech representation of the at least one training utterance;
obtaining the respective transcription of the corresponding spoken utterance sampled from the environment of the voice-enabled device; and
determining that the respective transcription of the corresponding spoken utterance is different than the corresponding transcription that is paired with the corresponding speech representation of the at least one training utterance.

28. The system of claim 27, wherein an embedding model or a portion of the speech model generates the respective embedding for each of the corresponding spoken utterance and the corresponding speech representation of the at least one training utterance.

29. The system of claim 26, wherein:
the corresponding speech representation of the at least one training utterance represents a spoken representation of a particular fixed term;
the speech model comprises a hotword detection model trained to detect a particular fixed term; and personalizing the hotword detection model to detect the particular fixed term comprises using the corresponding spoken utterance obtained for the at least one training utterance as a negative training sample.

30. The system of claim 16, wherein the operations further comprise, after pairing each of the one or more corresponding noisy audio samples with the corresponding transcription of the corresponding training utterance, storing, by the data processing hardware, on memory hardware in communication with the data processing hardware, the pairing of each of the one or more corresponding noisy samples with the corresponding transcription of the corresponding training utterance.

* * * * *